United States Patent
Rodman et al.

(10) Patent No.: US 7,227,938 B2
(45) Date of Patent: Jun. 5, 2007

(54) SYSTEM AND METHOD FOR DYNAMICALLY ESTABLISHING OPTIMUM AUDIO QUALITY IN AN AUDIO CONFERENCE

(75) Inventors: Jeffrey Rodman, San Francisco, CA (US); David Drell, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 711 days.

(21) Appl. No.: 10/378,712

(22) Filed: Mar. 3, 2003

(65) Prior Publication Data

US 2003/0224780 A1 Dec. 4, 2003

Related U.S. Application Data

(63) Continuation-in-part of application No. 10/335,108, filed on Dec. 31, 2002.

(60) Provisional application No. 60/360,984, filed on Mar. 1, 2002.

(51) Int. Cl.
H04M 3/42 (2006.01)

(52) U.S. Cl. ............. 379/202.01; 709/203; 370/229; 370/235

(58) Field of Classification Search ............... None
See application file for complete search history.

(56) References Cited

U.S. PATENT DOCUMENTS

| | | | |
|---|---|---|---|
| 3,573,377 A | 4/1971 | Anderson | |
| 3,612,767 A | 10/1971 | Anderson | |
| 3,649,761 A | 3/1972 | Bush | |
| 4,257,119 A | 3/1981 | Pitroda | |
| 4,311,877 A | 1/1982 | Kahn | |
| 4,763,317 A | 8/1988 | Lehman | |
| 5,592,470 A * | 1/1997 | Rudrapatna et al. | 370/320 |
| 5,677,728 A | 10/1997 | Schoolman | |
| 5,983,261 A | 11/1999 | Riddle | |
| 6,049,531 A | 4/2000 | Roy | |
| 6,088,368 A | 7/2000 | Rubinstain | |
| 6,118,761 A * | 9/2000 | Kalkunte et al. | 370/229 |
| 6,130,880 A | 10/2000 | Naudus | |
| 6,345,047 B1 | 2/2002 | Regnier | |
| 6,421,355 B1 | 7/2002 | Quiring | |
| 2001/0008556 A1 | 7/2001 | Bauer | |
| 2001/0033613 A1 | 10/2001 | Vitenberg | |

(Continued)

FOREIGN PATENT DOCUMENTS

EP 0 669 749 A1 8/1995

(Continued)

OTHER PUBLICATIONS

Schulzrinne, Voice Communication Across the Internet: A Network Voice Terminal, 1992, pp. 1-34, Amherst, MA.

(Continued)

*Primary Examiner*—Creighton Smith
(74) *Attorney, Agent, or Firm*—Wong, Cabello, Lutsch, Rutherford, & Brucculeri, LLP

(57) ABSTRACT

A system and method for dynamically establishing optimum audio quality in an audio conference is disclosed. A connection with one or more remote communication devices is initially established. An available data rate associated with the connection is then determined. Next, a bandwidth is assigned based on the available data rate. Finally, the assigned bandwidth is adjusted according to the available data rate.

20 Claims, 5 Drawing Sheets

U.S. PATENT DOCUMENTS

| | | |
|---|---|---|
| 2002/0093985 A1 | 7/2002 | Nimmagadda |
| 2002/0097679 A1 | 7/2002 | Berenbaum |
| 2002/0122429 A1 | 9/2002 | Griggs |
| 2002/0131377 A1 | 9/2002 | DeJaco et al. |
| 2003/0043785 A1* | 3/2003 | Liu et al. .................... 370/352 |
| 2003/0236827 A1* | 12/2003 | Patel et al. ................. 709/203 |

OTHER PUBLICATIONS

Haojun, Implementing an Audio Multipoint Processor on DSP Array, 2001, pp. 441-444.

Jung, The Multimedia Desktop Conference System Adaptability in Network Traffic on LAN, 1995, pp. 334-338, IEEE.

Noore, Computer-Based Multimedia Video Conferencing System, 1993, pp. 587-591.

Sasse, Workstation-based Multimedia Conferencing: Experiences from the MICE Project, 1994, pp. 1-6.

P. Mermelstein, "XP-001025802 G722, *a New CCITT Coding Standard for Digital Transmission of Wideband Audio Signals*," IEEE Communications Magazine; Jan. 1988—vol. 26, No. 1 pp. 8-15.

* cited by examiner

SYSTEM AND METHOD FOR DYNAMICALLY ESTABLISHING OPTIMUM AUDIO QUALITY IN AN AUDIO CONFERENCE

CROSS-REFERENCES TO RELATED APPLICATIONS

The present application claims priority from Provisional Patent Application Ser. No. 60/360,984, filed Mar. 1, 2002, which is incorporated herein by reference in its entirety. The present application is also a continuation in part of patent application Ser. No. 10/335,108, entitled Method and Apparatus for Wideband Conferencing, filed Dec. 31, 2002.

BACKGROUND OF THE INVENTION

1. Field of the Invention

The present invention relates generally to the field of teleconferencing, and more particularly to a system and method for dynamically establishing optimum audio quality in an audio conference.

2. Background of the Invention

The telecommunications industry is constantly creating alternatives to travel for reaching a meeting forum. Teleconferencing has enabled many users to avoid long and expensive trips merely to meet with others to discuss business related topics and make important decisions. In addition, teleconferencing often replaces face to face meetings involving even the shortest of trips, such as those involving office locations relatively close in distance.

Typically, teleconferencing efficiency increases as the quality of the audio increases. Unfortunately, the quality of the audio in teleconferencing can be compromised by quality of conventional telephone lines. Telephone lines often vary markedly from one telephone line to another telephone line. Consequently, the data rates that can be achieved utilizing the telephone lines vary considerably as well. The varying telephone lines and data rates that can be achieved is particularly of concern with respect to international and/or long-distance connections, since the variation of the telephone lines and the data rates creates a potentially unreliable communication system.

Further, obtaining the best audio quality for a particular connection is complicated by the fact that the connection type (e.g., long-distance, international, etc.) is not typically known until the actual connection is established between two communication devices. In addition, when speech compressors are utilized in an attempt to improve audio quality, matching the data rate of the speech compressors must be considered as well.

Wideband audio-over-POTS (plain old telephone system) combines a modem with a codec in order to send compressed speech over a phone line. These wideband audio-over-POTS systems are often used in broadcasting to send higher-quality audio over convention telephone lines. Wideband audio-over-data (such as IP or ISDN) systems are also available and operate similarly. However, these systems are still limited by the communications line, itself, and thus cannot send audio at a faster data rate or at a higher bandwidth than the communication lines can accommodate.

Codecs (coder/decoder) compress speech into data for transmission, sometimes via conventional telephone lines. While the compression of the speech allows for a higher quality transmission of audio data, the bandwidth of the audio data is fixed by the codec. The data rate is also dependent upon the bandwidth, and thus, in these embodiments both the data rate and the bandwidth are static. For instance, G.711 provides a 3.3 kHz bandwidth codec capable of transmitting data at 64 kbps.

Alternatively, multi-rate codecs are capable of operating at different rates. In other words, multi-rate codecs provide a fixed audio bandwidth, but different quality levels depending on data rates. For instance, G.722 can provide 7 kHz audio bandwidth capable of transmitting data at either 48 kbps or 64 kbps. As another example, G.722.1 provides 7 kHz audio bandwidth and can transmit data from 24 kbps to 32 kbps. Although varying data rates are provided for each bandwidth, the audio bandwidth is static. Accordingly, data rates outside of those data rates specifically prescribed by the particular audio bandwidth cannot be achieved. Furthermore, in wideband-over-POTS systems, codecs are typically disabled when the data rate drops below a certain level, and narrowband audio is utilized instead to provide audio. Thus, codecs are not practical when acceptable audio cannot be provided due to lack of availability of a specific data rate via a conventional telephone line.

Therefore, it can be appreciated that there exists a need for a system and method for dynamically establishing optimum audio quality in an audio conference.

SUMMARY OF THE INVENTION

The present invention provides in various embodiments a system and method for dynamically establishing optimum audio quality in an audio conference.

In a system according to one embodiment of the present invention, a local communication device establishes a connection with one or more remote communication devices for conducting the audio conference. A data rate monitor module determines an available data rate associated with the connection. Next, a bandwidth adjustment module assigns a bandwidth based on the available data rate, and adjusts the bandwidth according to any changes in the data rate.

In a method according to another embodiment of the present invention, a connection is established with one or more remote communication devices for conducting the audio conference. An available data rate associated with the connection is then determined. Next, a bandwidth is assigned based on the available data rate by a codec. Subsequently, the bandwidth is adjusted according to any changes in the available data rate. This adjustment may be an increase in bandwidth according to an increase in the available data rate or a decrease in bandwidth according to a decrease in the available data rate.

A further understanding of the nature and advantages of the inventions herein may be realized by reference to the remaining portions of the specification and the attached drawings.

DESCRIPTION OF THE EXEMPLARY EMBODIMENTS

Figure 1:
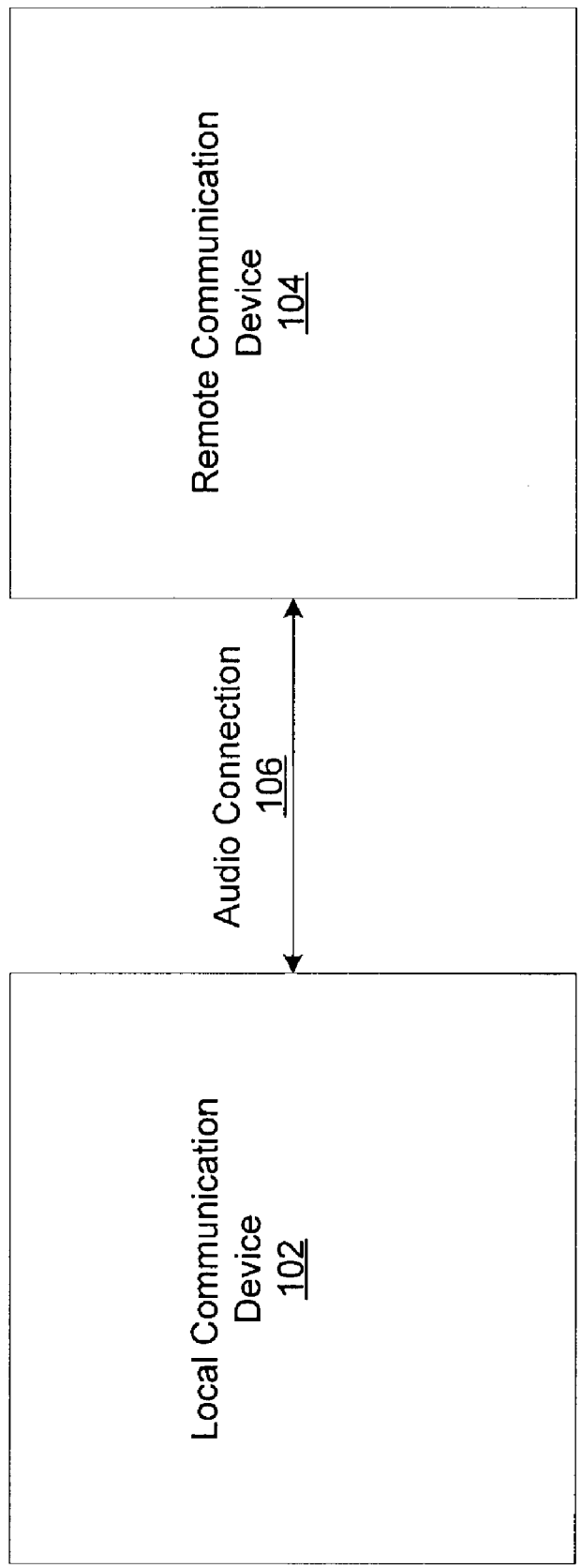
FIG. 1 is a schematic diagram illustrating a local communication device establishing a connection with a remote communication device in accordance with one embodiment of the present invention.

As shown in the exemplary drawings wherein like reference numerals indicate like or corresponding elements among the figures, embodiments of a system and method according to the present invention will now be described in detail. The following description sets forth an example of a system and method for dynamically establishing optimum audio quality between communication devices.

Referring now to FIG. 1, a schematic diagram illustrating a local communication device 102 establishing an audio connection 106 with a remote communication device 104 in accordance with one embodiment of the present invention is shown. The local communication device 102 and the remote communication device 104 may be a telephone, a speakerphone, a conferencing system, such as audio, video, data, multimedia, and so on, a bridge, or an audio device for use with external systems, speakers, microphones, etc. There may be more than one remote communication device 104 with which the local communication device 102 establishes the audio connection 106. For instance, the local communication device 102 can establish an audio connection 106 with more than one remote communication device 104 utilizing a bridge. Further, any type of audio connection 106 is within the scope of the invention. For example, the audio connection may be a POTS connection, an IP connection, an ISDN connection, a DSL connection, a satellite connection, and so on.

The local communication device 102 typically establishes the audio connection 106 with the remote communication device 104 for the purpose of conducting an audio conference. Optimum audio quality is dynamically established by the local communication device 102 and/or the remote communication device 104 via the audio connection 106. The local communication device 102 and/or the remote communication device 104 monitor the audio connection 106, and can adjust bandwidth based on characteristics associated with the audio connection 106, such as data rate. Accordingly, the bandwidth can slowly increase or decrease according to the data rate available, resulting generally in low noise, low distortion, and optimum audio quality. Furthermore, optimum audio quality is dynamically established and maintained throughout the ongoing audio conference by virtue of the ability of the local communication device 102 and/or the remote communication device 104 to adjust the bandwidth of the audio connection 106.

Figure 2:
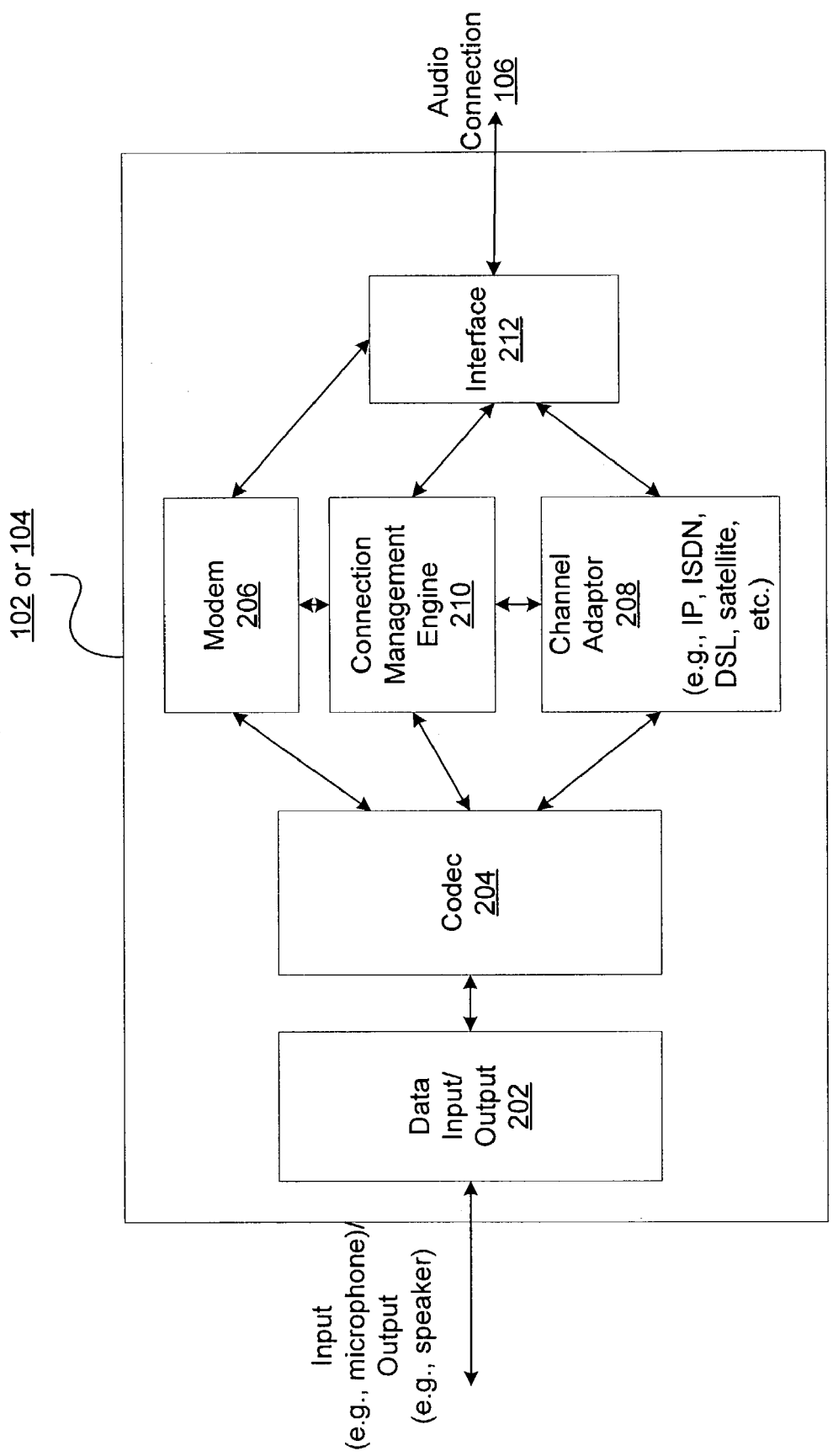
FIG. 2 is a schematic diagram illustrating exemplary components associated with the local communication device and/or the remote communication device in accordance with the present invention.

Referring now to FIG. 2, a schematic diagram illustrating exemplary components associated with the local communication device 102 and/or the remote communication device 104 in accordance with the present invention is shown. As discussed herein, the local communication device 102 and/or the remote communication device 104 may include various components. However, for simplicity of discussion, the components will be discussed in connection with the local communication device 102. It should be noted that not all elements of the local communication device 102 and/or the remote communication device 104 are necessary in alternative embodiments or additional elements may be included in alternative embodiments.

A data input/output component 202 can receive audio data from a source and also perform audio data output functions for audio data received from the remote communication device 104. For instance, the data input/output component may include a microphone for collecting audio data and a speaker for outputting audio data. Audio data from at least one microphone is forwarded to a codec 204 via a data input/output component 202 for compression of the audio data. Preferably, the codec 204 can be operated at different bandwidths as well as at different data rates. In other words, the codec 204 is a codec designed such that for a constant level of quality, a required data rate will be reduced as the bandwidth is reduced. In order to create the codec 204, for example, a constant algorithm can be employed with the coding parameters of the algorithm adjusted to achieve the reduction in bandwidth according to the reduction in data rate. Alternatively, various codecs 204 may be selected depending upon the data rate available, a fixed narrow bandwidth codec 204 can be combined with a variable-bandwidth codec 204, etc. However, any codec 204 is within the scope of the invention.

The compressed audio data is forwarded to a modem 206 and/or a channel adaptor 208. Subsequently, the modem 206 and/or the channel adaptor 208 forward the audio signals to an interface 212, which sends the audio signals to the one or more remote communication devices 104 via the audio connection 106. The modem 206 converts the audio data into an analog signal for transmission via a POTS audio connection 106, a cable audio connection 106, etc. The modem 206 can establish the frequency at which the data will be transmitted via the audio connection 106.

Similarly, the channel adaptor 208 converts the digital data into a format acceptable for transmission via a data channel (the particular audio connection 106 (FIG. 1)), such as IP, ISDN, DSL, and so on. However, the compressed audio data forwarded to the channel adaptor 208 is not converted into an analog signal. Rather the audio data forwarded to the channel adaptor 208 is transmitted in digital form via a digital transmission medium, such as the aforementioned digital transmission mediums.

A connection management engine 210 is coupled to the codec 204, the modem 206, and the channel adaptor 208 for monitoring the available data rate of the audio connection 106 and instructing the codec 204 to make any necessary adjustments to bandwidth in order to establish optimum audio quality. The interface 212 is coupled to the connection management engine 210, which can monitor the rate of the connection via the interface 212. The data rate can be monitored continuously, periodically (e.g., every five minutes), at a function specific time (e.g. at the beginning of the conference, during the first ten minutes of the conference, etc.), and so on. Accordingly, the bandwidth may be increased or decreased smoothly, avoiding significant noise and distortion. Furthermore, by dynamically establishing and maintaining optimum audio quality in this manner, potential improvements in the audio quality below an arbitrary data rate need not be relinquished due to an inability to adjust the bandwidth.

Figure 3:
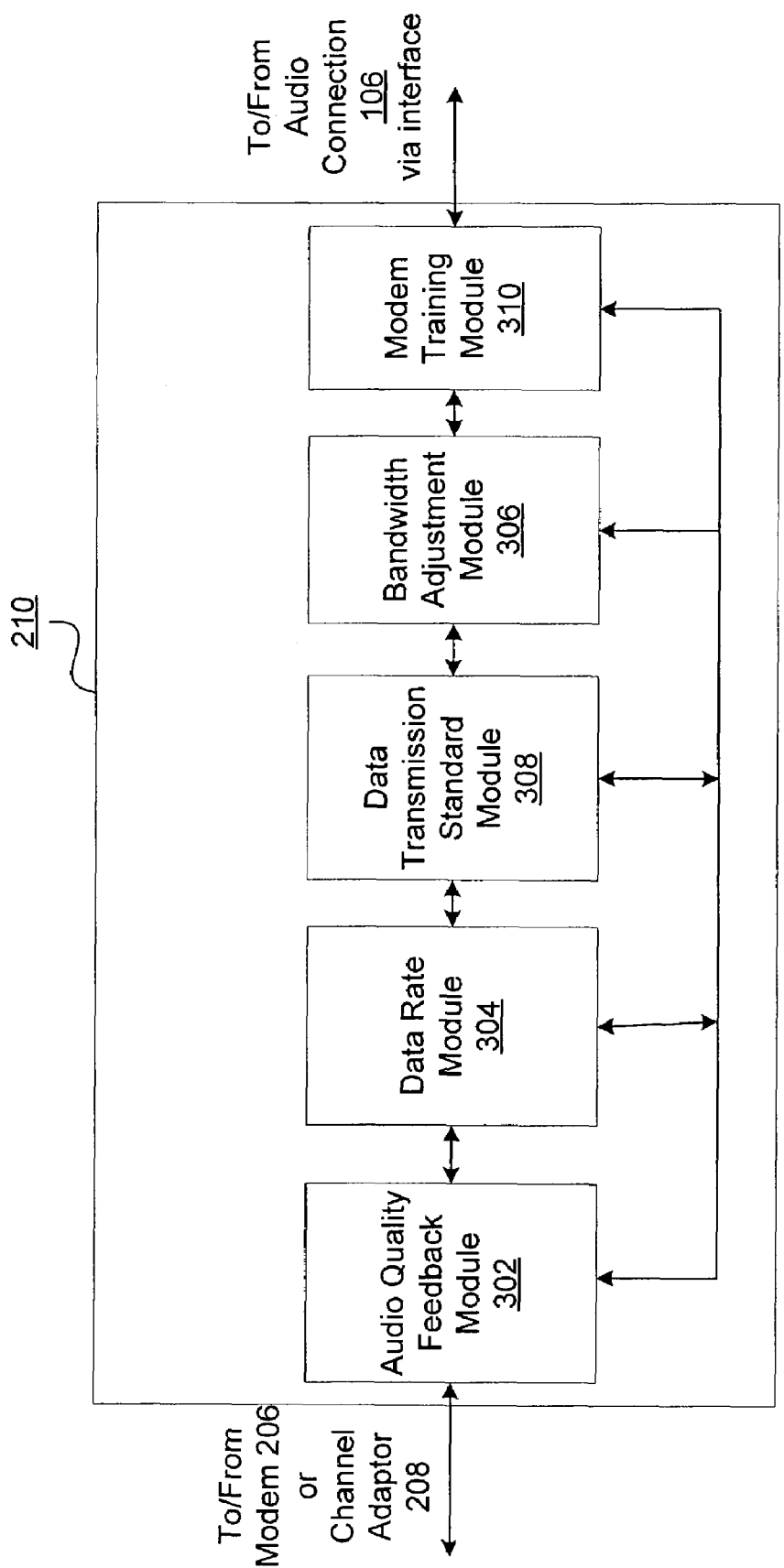
FIG. 3 is a schematic diagram illustrating exemplary modules associated with a connection management engine in accordance with the present invention.

Referring now to FIG. 3, a schematic diagram illustrating exemplary modules associated with the connection management engine 210 in accordance with the present invention is shown. Optionally, an audio quality feedback module 302 can receive feedback from the local communication device 102, the remote communication device 104, and/or users participating in the audio conference. For instance, the audio quality feedback module 302 may ascertain audio quality from monitoring the audio connection 106, the modem 206, and/or the channel adaptor 208, and/or the data received via the audio connection 106 by examining the bit error rate (BER), the data rate, etc.

Alternatively, or in addition to monitoring the audio connection 106, the modem 206, and/or the channel adaptor 208, an input mechanism (not shown) may be associated with the local communication device 102 and/or the remote communication device 104 allowing audio conference participants, or users of the devices, generally, to provide feedback as to the audio quality of the audio conference. For example, a user may be able to rate the quality of the audio conference, which causes the local communication device 102 and/or the remote communication device 104 to initiate modifications in order to improve the quality in response to the user input.

A data rate module 304 monitors the audio connection 106 for the available data rate associated with the audio connection 106. Different audio connections 106 can support varying data rates. The data rate module 304 determines which data rate(s) is available for sending and receiving data. The data rate module 304 can optionally provide this data rate(s) information to the audio quality feedback module 302.

The data rate module 304, optionally, forwards to a data transmission standard module 308 and/or a bandwidth adjustment module 306 any effects the modem 206, the channel adaptor 208, and/or the audio connection 106 have on the available data rate. Alternatively, the data rate module 304 can forward the available data rate directly to the bandwidth adjustment module 306.

The data transmission standard module 308 can advise the bandwidth adjustment module 306 and/or the data rate module 304 of standard bandwidths and frequencies that, typically, are associated with specified data rates. The data transmission standard module 308 can, accordingly, be a reference for the bandwidth adjustment module 306 and/or data rate module 304.

Alternatively, or in addition to being a reference, the data transmission standard module 308 can create instructions to forward to the bandwidth adjustment module 306 based on information received from the data rate module 304. In other words, in one embodiment of the present invention, the data transmission standard module 308 creates and forwards a command to the bandwidth adjustment module 306 to adjust the bandwidth of the audio connection 106 based on the available data rate, changes in the available data rate, etc., which the bandwidth adjustment module 306 in turn forwards to the codec 204 (FIG. 2) to adjust the bandwidth.

The bandwidth adjustment module 306 can adjust the bandwidth of the audio connection 106 and/or the frequency of the audio signal being transmitted via the audio connection 106 by forwarding instructions to the codec 204 to adjust the bandwidth, as discussed herein. For instance, as discussed previously, the codec 204 may initially assign a bandwidth to the audio connection and this bandwidth may be adjusted by the codec 204 based on instructions received from the bandwidth adjustment module 306 as the available data rate changes.

The frequency of the audio signal may also be adjusted by the modem 206 and/or channel adaptor 208 as the bandwidth and/or data rate changes. The bandwidth adjustment module 306 can instruct the codec 204 to adjust the bandwidth based on information from the audio quality feedback module 302, information from the data rate module 304, and/or information and/or a command from the data transmission standard module 308. As discussed herein, the bandwidth may be established at commencement of the audio conference and/or at any time during the audio conference.

In one embodiment of the present invention, the connection management engine 210 includes a modem training module 310 for adjusting the training time of the modem. In this embodiment, a user of the local communication device 102 and/or the remote communication device 104 can adjust the training time of the modem 206 associated with the particular device. For example, the user can select between a short training time, which yields lower data rates, or a long training time, which yields higher data rates. Accordingly, the audio connection 106 can be optimized for specific data transmissions. Any adjustment to the training time of the modem 206 is within the scope of the present invention.

Figure 4:
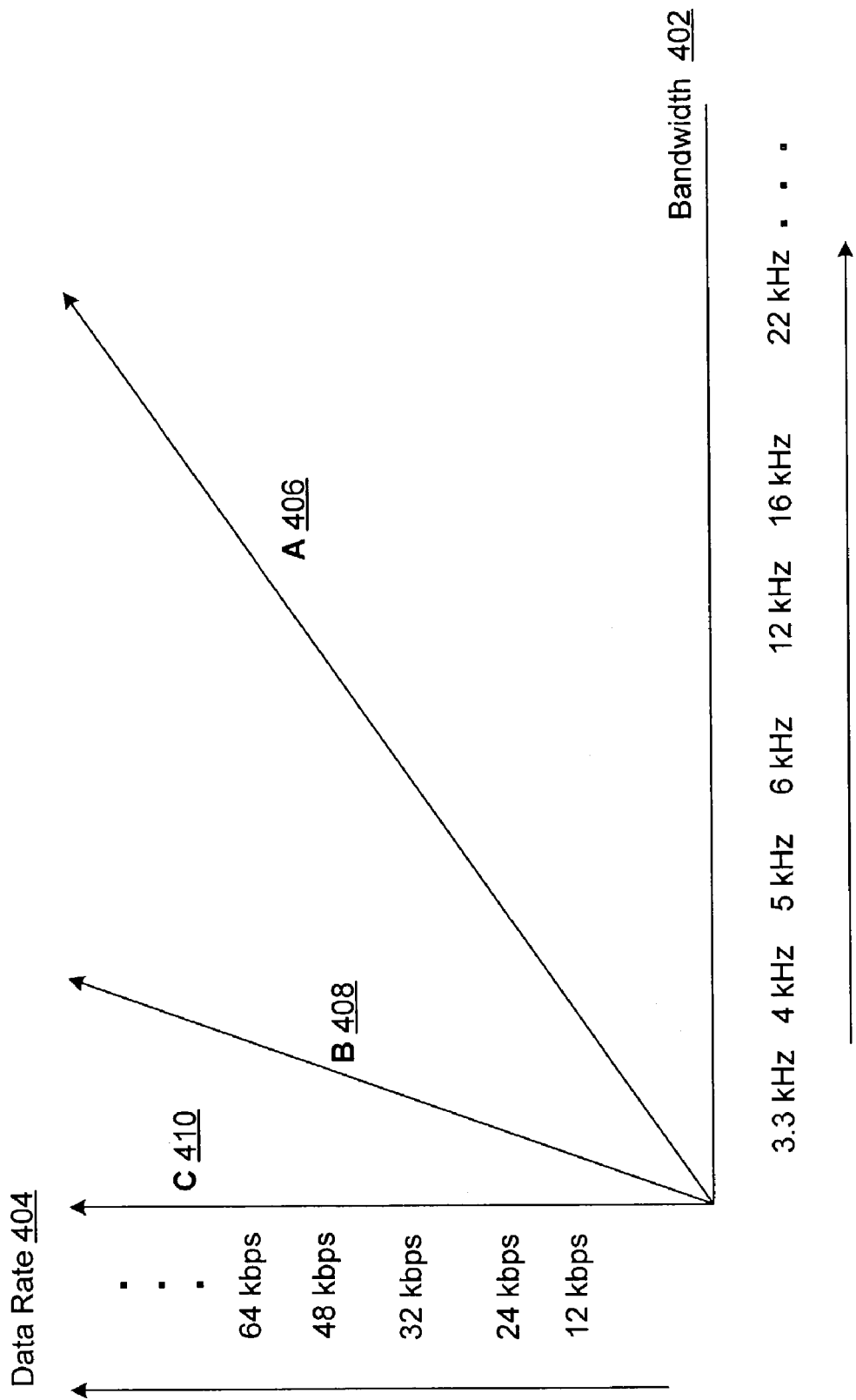
FIG. 4 is a schematic diagram illustrating exemplary relationships between bandwidth and data rate in accordance with the present invention.

Referring now to FIG. 4, a schematic diagram illustrating exemplary relationships between bandwidth and data rate in accordance with the present invention is shown. The bandwidth 402 and/or frequency range is indicated along the x-axis. The y-axis shows varying data rates 404. Any spectrum of bandwidths 402 and/or data rates 404 are within the scope of the present invention. The data rates 404 are, typically, a function of the audio connection 106 (FIG. 1), such as POTS, DSL, etc.

Generally, an audio connection 106 is established by the local communication device 102 with the one or more remote communication devices 104, such as POTS, ISDN, etc. Once the audio connection 106 type is agreed upon, the local communication device 102 and the one or more remote communication devices 104 negotiate to select the codec 204 (e.g., G.722, G.722.2, etc.) that both the local communication device 102 and the one or more remote communication devices 104 want to utilize for communications. A set of operational parameters, such as data rate, audio bandwidth, and so on are also negotiated between the local communication device 102 and the one or more remote communication devices 104. This type of negotiation is a common part of conferencing protocols, such as H.323, etc. Once the local communication device 102 and the one or more remote communication devices 104 have agreed upon the aforementioned factors, the audio connection 106 is established.

Line A 406 indicates that as the data rate 404 increases, the bandwidth 402 increases. Similarly, as the data rate 404 decreases, the bandwidth 402 decreases. Thus, when the data rate 404 increases or decreases, a message is forwarded to the bandwidth adjustment module 306 by the data rate module 304 (FIG. 3) and/or via the data transmission standard module 308 to increase or decrease the bandwidth, respectively. As discussed herein, the bandwidth adjustment module 306 creates and forwards a command to the codec 204 to change the bandwidth according to an exemplary embodiment.

For example, although the audio connection 106 can achieve a data rate of 16 kbps, the data rate module may change the data rate to 12 kbps in order to lower the BER and accomplish higher data integrity. The bandwidth 402 may also be decreased by the bandwidth adjustment module 306 according to the change in the data rate 404 from 16 kbps to 12 kbps. Decreasing or increasing the bandwidth in response to a decrease or increase in the data rate appears to occur in a linear fashion. The linear changes to the bandwidth eliminate the "all or nothing" characteristics of many existing systems (e.g., audio-over-data, audio-over-POTS, etc.). Furthermore, the bandwidth changes smoothly so that the changes are not easily detected. In one embodiment, when the data rate becomes extremely low, uncoded narrowband audio can be transmitted, the change being made smoothly so as to not be easily detected.

Line B 408 indicates that the bandwidth 402 is only mildly increased in response to major increases in available data rate 404. Line A 406 and Line B 408 are representative of two different audio connection 106 and/or modem 206 types, which are typically known at the beginning of the audio conference. Line B 408 may be utilized rather than Line A 406 in a scenario in which more bits are utilized for the same audio quality, for instance. For example, if the audio connection 106 is established via ISDN, the available data rate 404 may be higher than the available data rate 404 provided by other audio connections 106. Thus, a simpler codec 204, such as G.722 may be utilized that requires less computation, but the G.722 codec 204 typically uses more bits in order to accomplish the same audio quality as that provided by a G.722.2 codec 204.

As another example, Line B 408 may be utilized instead of Line A 406 where the audio connection 106 is a digital channel having a portion reserved for data and a portion reserved for audio and a very high data error rate is associated with the audio connection 106. Thus, a large portion of the audio connection 106 is dedicated to error correction, leaving less room available for transmitting audio data due to additional room utilized for data error control.

Line C 410 indicates that the bandwidth 402 is left unchanged when the available data rate 404 changes. Any change in the bandwidth 402 in response to changes in the available data rate 404 is within the scope of the present invention.

Typically, at lower frequencies, increased bandwidth largely improves intelligibility and perceived quality of the audio signal exchanged during the audio conference. For example, 4 kHz bandwidth audio signals are markedly clearer than 3 kHz bandwidth audio signals, while 5 kHz bandwidth audio signals are better than 4 kHz bandwidth audio signals, but by a lesser degree, and so on. Accordingly, when the codec 204 adjusts the bandwidth downward (i.e., decreasing the bandwidth) from higher frequencies, the audio signals typically become clearer. In addition, the codec 204 can conceal telephone line noise, buzzing, and so forth, thereby enhancing comprehensibility of the audio signals.

Figure 5:
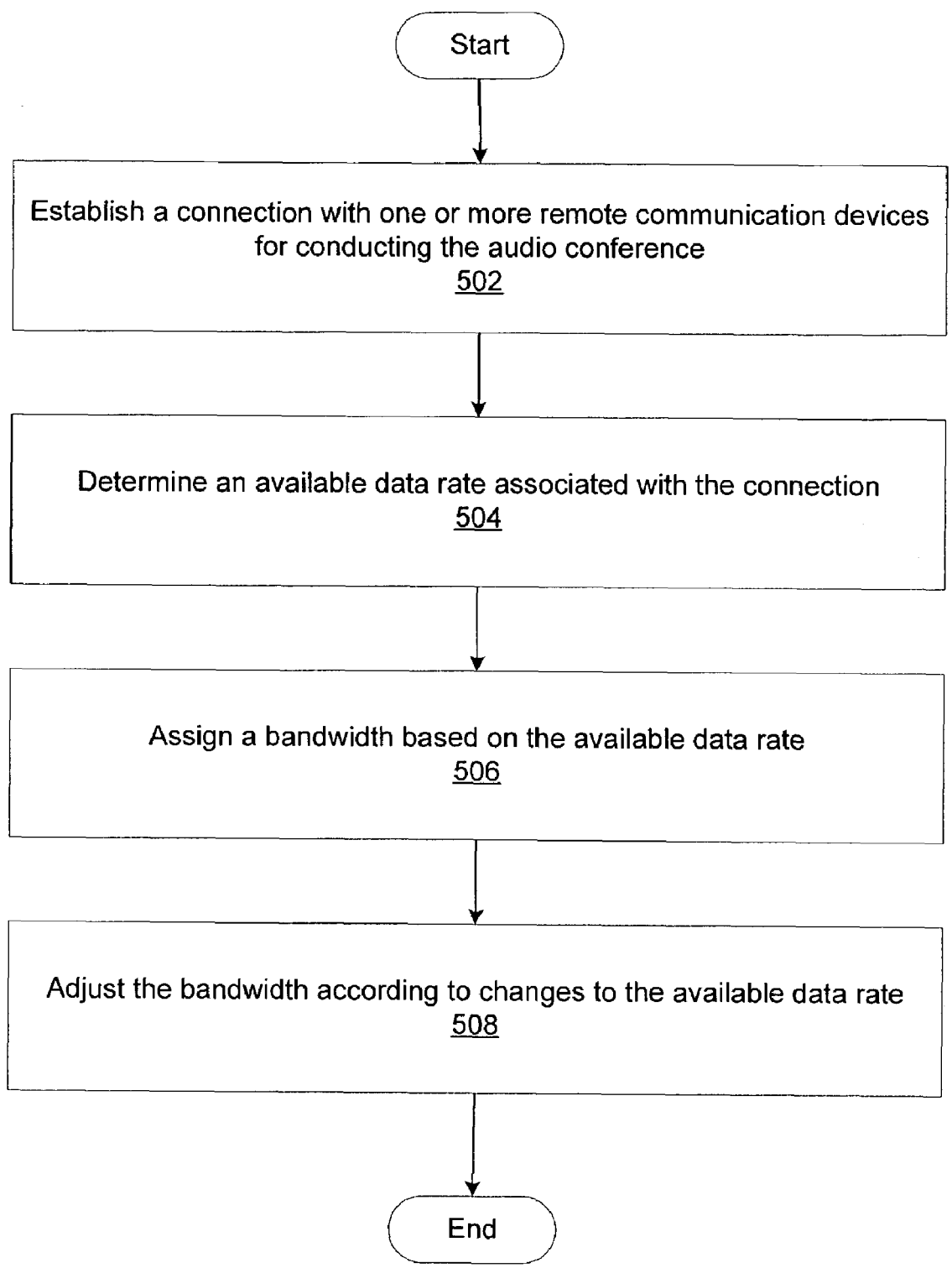
FIG. 5 is a flowchart illustrating an exemplary process for dynamically establishing optimum audio quality in accordance with the present invention.

Referring now to FIG. 5, a flowchart illustrating an exemplary process for dynamically establishing optimum audio quality in accordance with the present invention is shown. The flowchart is discussed from the perspective of the local communication device 102 (FIG. 1). At step 502, a connection with one or more remote communication devices 104 is established for conducting an audio conference. The connection may be via a modem through a POTS connection, via a data channel such as IP, ISDN, satellite, or any other transmission medium. The one or more remote communication devices may be a telephone, speakerphone, conference system (such as audio, video, data, multimedia, etc.), a bridge further coupled to at least one remote communication device 104, an audio device for use with external systems, microphones, speakers, etc.

At step 504, an available data rate associated with the connection is determined. The available data rate is typically limited by the line characteristics of the audio connection 106 (FIG. 1). For instance, some audio connections 106 can only support data rates of 16 kbps, 20 kbps, 30 kbps, and so on, while poorer audio connections 106 can support 6 kbps, 8 kbps, 11 kbps, etc. Further, the data rate of the audio connection 106 can be changed according to performance of the modem 206 or the channel adaptor 208 over the audio connection 106.

At step 506, a bandwidth is assigned based on the available data rate. Typically the codec 204 assigns the bandwidth based on the available data rate associated with the audio connection 106. Then, at step 508, the assigned bandwidth is adjusted according to changes to the available data rate. The bandwidth can be assigned at the beginning of the audio conference as well as adjusted at the beginning of the audio conference, during the audio conference, etc. The bandwidth may increase as the data rate increases and vice versa in one embodiment of the present invention. In another embodiment of the present invention, the bandwidth may not change as the data rate increases or decreases.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for dynamically establishing optimum audio quality in an audio conference, comprising;
   establishing a connection, by a local communication device, with one or more remote communication devices for conducting the audio conference;
   determining an available data rate associated with the connection;
   assigninig an audio bandwidth based on the available data rate; and
   adjusting the audio bandwidth proportionally to changes to the available data rate;
   wherein assigning the bandwidth further comprises adjusting a training time associated with the audio bandwidth.

2. The method of claim 1, wherein the adjusting occurs at the beginning of the audio conference.

3. The method of claim 1, wherein the adjusting occurs during the audio conference.

4. The method of claim 1, wherein the one or more remote communication devices is a conferencing system, a bridge or a telephone.

5. The method of claim 1, wherein the connection is an analog connection or a digital connection.

6. The method of claim 1, wherein the audio bandwidth is adjusted in response to received audio quality feedback.

7. The method of claim 1, wherein the audio bandwidth is adjusted to narrowband.

8. A device in a conference system for dynamically establishing optimum audio quality, wherein the conference system is coupled to a remote device via a connection, the device comprising:
   a local interface having an audio input and an audio output;
   a communication module for communicating via the connection;
   a codec coupled to the local interface for encoding the audio input with a first bandwidth and decoding to generate the audio output; and
   a connection management module coupled to the codec and the communication interface,
   wherein the connection management module is operable to,
      determine the first audio bandwidth proportional to the available data rate through the connection; and adjust the audio bandwidth proportionally to changes to the available data rate through the connection.

9. The device of claim 8, wherein the communication module includes:
a modem coupled to the codec for modulating the encoded audio input; and
a plain old telephone service (POTS) interface coupled to the modem,
wherein the POTS interface is coupled to the remote device via the connection, wherein the connection is POTS connection.

10. The device of claim 8, wherein the communication module includes:
a channel adaptor coupled to the codec; and
a digital interface coupled to the channel adaptor and further coupled to the remote device via the connection,
wherein the channel adaptor is operable to convert the encoded audio input for transmission through the digital interface and the connection.

11. The device of claim 10, wherein the connection is an IP connection, an ISDN connection or a DSL connection.

12. The device of claim 8, wherein the connection management module includes:
an audio quality feedback module coupled to the local interface;
a data rate module coupled to the local interface;
a data transmission standard module coupled to the local interface;
an audio bandwidth adjustment module coupled to the local interface; and
a modem training module coupled to the local interface and the communication interface module.

13. The device of claim 8, wherein the connection management module is operable to adjust the audio bandwidth at the beginning of an audio conference or during an audio conference.

14. The device of claim 8, wherein the one or more remote devices is a conferencing system, a bridge or a telephone.

15. A conference system for dynamically establishing optimum audio quality, the system comprising:
a local communication device including:
a local interface having an audio input and an audio output;
a communication module for communicating via a connection;
a codec coupled to the local interface for encoding the audio input with a first bandwidth and decoding to generate the audio output; and
a connection management module coupled to the codec and the communication interface;
a remote communication device including:
a remote interface having an remote audio input and an remote audio output;
a remote communication module for communication;
a remote codec coupled to the remote interface for encoding the remote audio input with the second audio bandwidth and decoding with the first audio bandwidth to generate the remote audio output; and
a remote connection management module coupled to remote codec and the remote communication interface; and
a connection coupling the local communication device and the remote communication device,
wherein the connection management module in the local communication device is operable to,
determine the fist audio bandwidth proportional to the available data rate through the connection; and
adjust the audio bandwidth proportionally to changes to the available data rate through the connection.

16. The system of claim 15, wherein the remote communication module includes:
a remote channel adaptor coupled to the remote codec; and
a remote digital interface coupled to the remote channel adaptor and further coupled to the local digital interface via the connection.

17. The system of claim 15, wherein the communication module in the local communication device includes:
a modem coupled to the codec for modulating the encoded audio input; and
a plain old telephone service (POTS) interface coupled to the modem,
wherein the POTS interface is coupled to the remote device via the connection, wherein the connection is POTS connection.

18. The system of claim 15, wherein the communication module in the local communication device includes:
a channel adaptor coupled to the codec; and
a digital interface coupled to the channel adaptor and further coupled to the remote device via the connection,
wherein the channel adaptor is operable to convert the encoded audio input for transmission through the digital interface and the connection.

19. The system of claim 18, wherein the connection is an IP connection, an ISDN connection or a DSL connection.

20. The system of claim 18, wherein the connection management module in the local communication device includes:
an audio quality feedback module coupled to the local interface;
a data rate module coupled to the local interface;
a data transmission standard module coupled to the local interface;
an audio bandwidth adjustment module coupled to the local interface; and
a modem training module coupled to the local interface and the communication interface module.

* * * * *